(12) United States Patent
Itadani et al.

(10) Patent No.: US 9,677,670 B2
(45) Date of Patent: Jun. 13, 2017

(54) SLIDING PARTS

(71) Applicant: EAGLE INDUSTRY CO., LTD., Tokyo (JP)

(72) Inventors: Masatoshi Itadani, Tokyo (JP); Kazumasa Sunagawa, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/100,272

(22) PCT Filed: Dec. 5, 2014

(86) PCT No.: PCT/JP2014/082247
§ 371 (c)(1),
(2) Date: May 27, 2016

(87) PCT Pub. No.: WO2015/087800
PCT Pub. Date: Jun. 18, 2015

(65) Prior Publication Data
US 2017/0002930 A1 Jan. 5, 2017

(30) Foreign Application Priority Data
Dec. 9, 2013 (JP) ................................. 2013-254440

(51) Int. Cl.
*F16J 15/34* (2006.01)
*F16C 33/72* (2006.01)
*F16C 33/74* (2006.01)

(52) U.S. Cl.
CPC ........... *F16J 15/3412* (2013.01); *F16C 33/72* (2013.01); *F16C 33/743* (2013.01); *F16J 15/34* (2013.01)

(58) Field of Classification Search
CPC ...... F16J 15/34; F16J 15/3404; F16J 15/3408; F16J 15/3412; F16J 15/3416; F16J 15/3424
See application file for complete search history.

(56) References Cited

U.S. PATENT DOCUMENTS 4,155,561 A * 5/1979 Rudy ..................... F16L 23/18
277/641
5,071,141 A 12/1991 Lai et al. ........................ 277/65
(Continued)

FOREIGN PATENT DOCUMENTS

CN 1060345 4/1992 ............... F16J 15/34
CN 1215135 4/1999 ............... F16J 15/54
(Continued)

OTHER PUBLICATIONS

Chinese Office Action issued in application 201480066268.3, dated Jan. 4, 2017 (16 pgs).
(Continued)

*Primary Examiner* — Kristina Fulton
*Assistant Examiner* — L. Susmitha Koneru
(74) *Attorney, Agent, or Firm* — Hayes Soloway P.C.

(57) ABSTRACT

Sliding parts of a pair of annular bodies include sealing faces that relatively slide on each other. A reversed Rayleigh step mechanism serving as a negative pressure generation mechanism is provided in at least one of the sealing faces, and a negative pressure generation groove that forms the reversed Rayleigh step mechanism is provided in an arc shape along the circumferential direction of the sealing face so as to be isolated from a high pressure fluid side and a low pressure fluid side by a land section.

5 Claims, 6 Drawing Sheets

(56) References Cited

U.S. PATENT DOCUMENTS

| | | | | |
|---|---|---|---|---|
| 5,246,295 | A * | 9/1993 | Ide | F16J 15/3432 384/124 |
| 5,498,007 | A | 3/1996 | Kulkarni et al. | 277/96.1 |
| 5,501,470 | A | 3/1996 | Fuse et al. | 277/96.1 |
| 5,556,111 | A * | 9/1996 | Sedy | F16J 15/3412 277/400 |
| 6,446,976 | B1 * | 9/2002 | Key | F16J 15/3416 277/367 |
| 6,575,470 | B1 * | 6/2003 | Gacek | F16J 15/3412 277/399 |
| 7,258,346 | B2 * | 8/2007 | Tejima | F16J 15/3412 277/399 |
| 7,744,094 | B2 | 6/2010 | Yanagisawa et al. | 277/399 |
| 9,151,389 | B2 | 10/2015 | Itadani | F16J 15/342 |
| 9,228,660 | B2 | 1/2016 | Hosoe et al. | F16J 15/3412 |
| 9,279,455 | B2 | 3/2016 | Tokunaga | F16C 33/74 |
| 9,371,912 | B2 | 6/2016 | Hosoe et al. | F16J 15/34 |
| 2012/0217705 | A1 * | 8/2012 | Hosoe | F16J 15/3412 277/400 |
| 2013/0209011 | A1 | 8/2013 | Tokunaga | 384/123 |
| 2014/0008873 | A1 | 1/2014 | Inoue | F16J 15/441 |
| 2014/0294330 | A1 | 10/2014 | Tokunaga | 384/123 |
| 2014/0294331 | A1 | 10/2014 | Tokunaga | 384/123 |
| 2014/0314352 | A1 | 10/2014 | Tokunaga | 384/123 |

FOREIGN PATENT DOCUMENTS

| | | | |
|---|---|---|---|
| CN | 1245552 | 2/2000 | F16J 15/34 |
| CN | 101057093 | 10/2007 | F16J 15/34 |
| CN | 101644333 | 2/2010 | F16J 15/34 |
| CN | 102713376 | 10/2012 | F16J 15/34 |
| CN | 103097782 | 5/2013 | F16C 17/04 |
| CN | 103429939 | 12/2013 | F04D 29/047 |
| JP | S57146955 | 9/1982 | F16J 15/34 |
| JP | S64049771 | 2/1989 | F16J 15/34 |
| JP | H01133572 | 9/1989 | F16J 15/34 |
| JP | 02236067 | 9/1990 | F16J 15/34 |
| JP | H0417570 | 2/1992 | F16J 15/34 |
| JP | H04101077 | 9/1992 | F16J 15/34 |
| JP | H07035242 | 2/1995 | F16J 15/34 |
| JP | H07180772 | 7/1995 | F16J 15/34 |
| JP | H07224948 | 8/1995 | F16J 15/34 |
| JP | H09329247 | 12/1997 | F16J 15/34 |
| WO | WO2012046749 | 4/2012 | F16C 17/04 |
| WO | WO 2012046749 A1 * | 4/2012 | F16C 17/045 |
| WO | WO2013035503 | 3/2013 | F16J 15/34 |
| WO | WO2014103630 | 7/2014 | F16J 15/34 |

OTHER PUBLICATIONS

International Preliminary Report on Patentability issued in application No. PCT/JP2014/082247, dated Jun. 23, 2016 (7 pgs).
International Preliminary Report on Patentability issued in application No. PCT/JP2014/082246, dated Jun. 23, 2016 (6 pgs).
International Search Report and Written Opinion issued in application No. PCT/JP2014/082247, dated Jan. 13, 2015 (13 pgs).
International Search Report and Written Opinion issued in application No. PCT/JP2014/082246, dated Jan. 13, 2015 (8 pgs).
International Search Report issued in application No. PCT/JP2013/082535, dated Mar. 3, 2014 (5 pgs).

* cited by examiner

SLIDING PARTS

TECHNICAL FIELD

The present invention relates to sliding parts suitable for a mechanical seal, a bearing, and other sliding portions for example. In particular, the present invention relates to sliding parts such as a sealing ring or a bearing in which a fluid lies on sealing faces to reduce friction and there is a need for preventing fluid leakage from the sealing faces.

BACKGROUND ART

In a mechanical seal serving as one example of the sliding parts, performances thereof are evaluated by a leakage amount, a wear amount, and torque. In the prior art, the performances are enhanced by optimizing sliding material and sealing face roughness of the mechanical seal, so as to realize low leakage, long life, and low torque. However, due to raising awareness of environmental problems in recent years, further improvement in the performances of the mechanical seal is required, and there is a need for technical development going beyond the boundary of the prior art.

Under such circumstances, the present applicant filed an application for a patent on the invention of sliding parts in which no leakage is caused in a static state, the sliding parts that are actuated with fluid lubrication in a rotating state including an initial stage of rotation while leakage is prevented, so that sealing and lubrication can be realized at the same time (hereinafter, referred to as the "prior art", see Patent Citation 1).

As one embodiment of this prior art, as shown in FIG. 6, sliding parts in which an outer peripheral side of sliding parts 20 including annular bodies serves as a high pressure fluid side and an inner peripheral side serves as a low pressure fluid side, a groove section 22a of a Rayleigh step mechanism 22 that forms a positive pressure generation mechanism is provided on a high pressure side of a sealing face 21-1 of one sliding part 20-1, a groove section 23a of a reversed Rayleigh step mechanism 23 that forms a negative pressure generation mechanism is provided on a low pressure side of a sealing face 21-2 of the other sliding part 20-2, the groove section 22 of the Rayleigh step mechanism 22 and the groove section 23a of the reversed Rayleigh step mechanism 23 respectively communicate with the high pressure fluid side via radial grooves 24-1 and 24-2, and are isolated from the low pressure fluid side by flat land sections R are proposed. Groove depth of the groove section 22a and the groove section 23a is about a few µm, and groove depth of the radial grooves 24-1 and 24-2 is about 10 µm. The groove depth of the radial grooves 24-1 and 24-2 is sufficiently greater than the groove depth of the groove section 22a and the groove section 23a.

CITATION LIST

Patent Literature

Patent Citation 1: WO 2012/046749

SUMMARY OF INVENTION

Technical Problem

The above prior art is a breakthrough invention in a point that a sealing property is improved by generating negative pressure on the low pressure side of the sealing face 21-2 by the reversed Rayleigh step mechanism 23.

In detail, the sealing property of a mechanical seal serving as one example of the sliding parts is generally determined by differential pressure between the high pressure fluid side and the low pressure fluid side and a gap between the sealing faces. In the above prior art, by making pressure in the groove section 23a of the reversed Rayleigh step mechanism 23 provided on the sealing face lower than low-pressure fluid pressure, pressure gradient of a part 25 (part surrounded by a broken line) of the groove section 23a on the inner peripheral side is reversed to make a negative pressure region, and the fluid to be leaked out to the low pressure fluid side in a region where the groove section 23a is provided and the fluid to be leaked out from a region 26 (positive pressure region surrounded by double chain lines) where no groove section 23a is provided are suctioned, so that the sealing property is improved.

Negative pressure generation force of the groove section 23a of the reversed Rayleigh step mechanism 23 is determined by a ratio x between circumferential land width b serving as a starting point and length a of the groove section 23a. As shown in FIG. 6, a certain level of land width b has to be ensured.

Meanwhile, the greater the negative pressure region including the groove section 23a on circumference on an inner periphery of the sealing face is, the more the sealing property as a mechanical seal is improved.

Therefore, in the above prior art, in order to sufficiently generate negative pressure of the groove section 23a of the reversed Rayleigh step mechanism 23, there is a need for ensuring a fixed level of the land width b (positive pressure region), and a range where the negative pressure region including the groove section 23a is provided is limited. Thus, there is a problem that a sealing limit is determined.

The present invention is achieved in order to improve a disadvantage of the above prior art while utilizing advantages thereof, and an objective of the present invention is to provide sliding parts by which a sealing function of sealing faces can be maintained by changing a ratio between a negative pressure region and a positive pressure region in the radial direction of the sealing faces and decreasing the positive pressure region while ensuring negative pressure generation force.

Solution to Problem

In order to achieve the foregoing objective, a first aspect of the sliding parts of the present invention is sliding parts of a pair of annular bodies including sealing faces that relatively slide on each other, characterized in that a reversed Rayleigh step mechanism serving as a negative pressure generation mechanism is provided in at least one of the sealing faces, a negative pressure generation groove that forms the reversed Rayleigh step mechanism is provided in an arc shape along the circumferential direction of the sealing face so as to be isolated from a high pressure fluid side and a low pressure fluid side by a land section, an upstream side end and a downstream side end of the negative pressure generation groove are isolated from each other by the land section, the downstream side end communicates with the high pressure fluid side via a deep groove, and a ratio $x=b/a$ between circumferential length a of the negative pressure generation groove and circumferential length b of the land section between the upstream side end of the negative pressure generation groove and the deep groove is set to be different in the radial direction.

According to this aspect, by obtaining sufficient negative pressure in a part where the circumferential length b of the land section is relatively large and letting a part where the circumferential length b of the land section is relatively small exist, without reducing negative pressure generation force of the reversed Rayleigh step mechanism serving as the negative pressure generation mechanism, the land width of a region where no negative pressure generation groove is provided, that is, a positive pressure region can be reduced, so that a sealing property can be improved.

A second aspect of the sliding parts of the present invention relates to the first aspect, characterized in that the ratio x is set to be small on an inner diameter side and large on an outer diameter side.

According to this aspect, the circumferential length b of the land section on the outer diameter side where circumferential speed is high is large, so that large negative pressure can be obtained, and the region where no negative pressure generation groove is provided can be decreased on the inner diameter side. Thus, the sealing property can be furthermore improved.

A third aspect of the sliding parts of the present invention relates to the second aspect, characterized in that the ratio x is set to be gradually changed.

According to this aspect, pressure on the inner diameter side of the negative pressure generation groove of the reversed Rayleigh step mechanism comes close to pressure on the outer diameter side, and the negative pressure generation force of the reversed Rayleigh step mechanism is not reduced. Thus, a sealing function of the sealing faces can be improved.

A fourth aspect of the sliding parts of the present invention relates to the second aspect, characterized in that the ratio x is set to be changed stepwise.

According to this aspect, the region of the land section where no negative pressure generation groove is provided can be ensured in a substantially fan shape on the outer diameter side. Thus, for example, a Rayleigh step serving as a positive pressure generation mechanism or the like can be provided in this part, so that freedom of design can be increased.

A fifth aspect of the sliding parts of the present invention relates to any of the first to fourth aspects, characterized in that in sliding parts of a pair of annular bodies including sealing faces that relatively slide on each other, fluid circulation grooves, each of the fluid circulation grooves including an inlet section where a fluid comes in from a high pressure fluid side, an outlet section where the fluid goes out to the high pressure fluid side, and a communication section that provides communication between the inlet section and the outlet section are provided in at least one of the sealing faces, the plurality of fluid circulation grooves is isolated from a low pressure fluid side by a land section, and provided in the circumferential direction of the sealing face and isolated by the land section, a positive pressure generation mechanism is provided in a part surrounded by the fluid circulation groove and the high pressure fluid side, a reversed Rayleigh step mechanism serving as the negative pressure generation mechanism is provided between the plurality of fluid circulation grooves, a negative pressure generation groove that forms the reversed Rayleigh step mechanism is provided in an arc shape along the circumferential direction of the sealing face so as to be isolated from the high pressure fluid side and the low pressure fluid side by the land section, an upstream side end and a downstream side end of the negative pressure generation groove are isolated by the land section, the downstream side end communicates with the high pressure fluid side via the inlet section of the fluid circulation groove, and circumferential length of the land section between the upstream side end of the negative pressure generation groove and the outlet section of the fluid circulation groove is set to be small on an inner diameter side and large on an outer diameter side.

According to this aspect, without reducing the negative pressure generation force, the region where no negative pressure generation groove is provided can be decreased, so that the sealing property can be improved. In addition, the sealed fluid is actively introduced onto the sealing face from the high pressure fluid side and discharged by the fluid circulation grooves. Thus, concentration of the fluid containing corrosion products and the like on the sealing face is prevented.

Since positive pressure (dynamic pressure) is generated on the sealing face by the positive pressure generation mechanism, a fluid film between the sealing faces is increased, so that a lubrication performance is improved.

Advantageous Effects of Invention

The present invention exhibits the following superior effects.

(1) The ratio $x=b/a$ between the circumferential length a of the negative pressure generation groove and the circumferential length b of the land section between the upstream side end of the negative pressure generation groove and the deep groove is set to be different in the radial direction. Thus, by obtaining sufficient negative pressure in the part where the circumferential length b of the land section is relatively large and letting the part where the circumferential length b of the land section is relatively small exist, without reducing the negative pressure generation force of the reversed Rayleigh step mechanism serving as the negative pressure generation mechanism, the land width of the region where no negative pressure generation groove is provided, that is, the positive pressure region can be reduced, so that the sealing property can be improved.

(2) The ratio x is set to be small on the inner diameter side and large on the outer diameter side. Thus, the circumferential length b of the land section on the outer diameter side where the circumferential speed is high is large, so that large negative pressure can be obtained, and the region where no negative pressure generation groove is provided can be decreased on the inner diameter side. Thus, the sealing property can be furthermore improved.

(3) The ratio x is set to be gradually changed. Thus, the pressure on the inner diameter side of the negative pressure generation groove of the reversed Rayleigh step mechanism comes close to the pressure on the outer diameter side, and the negative pressure generation force of the reversed Rayleigh step mechanism is not reduced. Thus, the sealing function of the sealing faces can be improved.

(4) The ratio x is set to be changed stepwise. Thus, the region of the land section where no negative pressure generation groove is provided can be ensured in a substantially fan shape on the outer diameter side. Therefore, for example, the Rayleigh step serving as the positive pressure generation mechanism or the like can be provided in this part, so that the freedom of design can be increased.

(5) The fluid circulation grooves and the positive pressure generation mechanism are provided on the sealing face, the reversed Rayleigh step mechanism serving as the negative pressure generation mechanism is provided between the plurality of fluid circulation grooves, and the circumferential length of the land section between the upstream side end of the negative pressure generation groove that forms the reversed Rayleigh step mechanism and the outlet section of the fluid circulation groove is set to be small on the inner diameter side and large on the outer diameter side. Thus, without reducing the negative pressure generation force, the region where no negative pressure generation groove is provided can be decreased, so that the sealing property can be improved. In addition, the sealed fluid is actively introduced onto the sealing face from the high pressure fluid side and discharged by the fluid circulation grooves. Thus, the concentration of the fluid containing corrosion products and the like on the sealing face is prevented.

Since the positive pressure (dynamic pressure) is generated on the sealing face by the positive pressure generation mechanism, the fluid film between the sealing faces is increased, so that the lubrication performance is improved.

BRIEF DESCRIPTION OF DRAWINGS

FIG. 5 is a view for illustrating a positive pressure generation mechanism formed from a Rayleigh step mechanism or the like, and a negative pressure generation mechanism formed from a reversed Rayleigh step mechanism or the like: FIG. 5(a) shows the Rayleigh step mechanism; and FIG. 5(b) shows the reversed Rayleigh step mechanism.

DESCRIPTION OF EMBODIMENTS

Hereinafter, with reference to the drawings, modes for carrying out the present invention will be described with examples based on embodiments. However, regarding size, material, shape, and relative arrangement of constituent parts described in the embodiments, and the like, there is no intention to limit the scope of the present invention only to those unless specifically and clearly described.

First Embodiment

Figure 1:
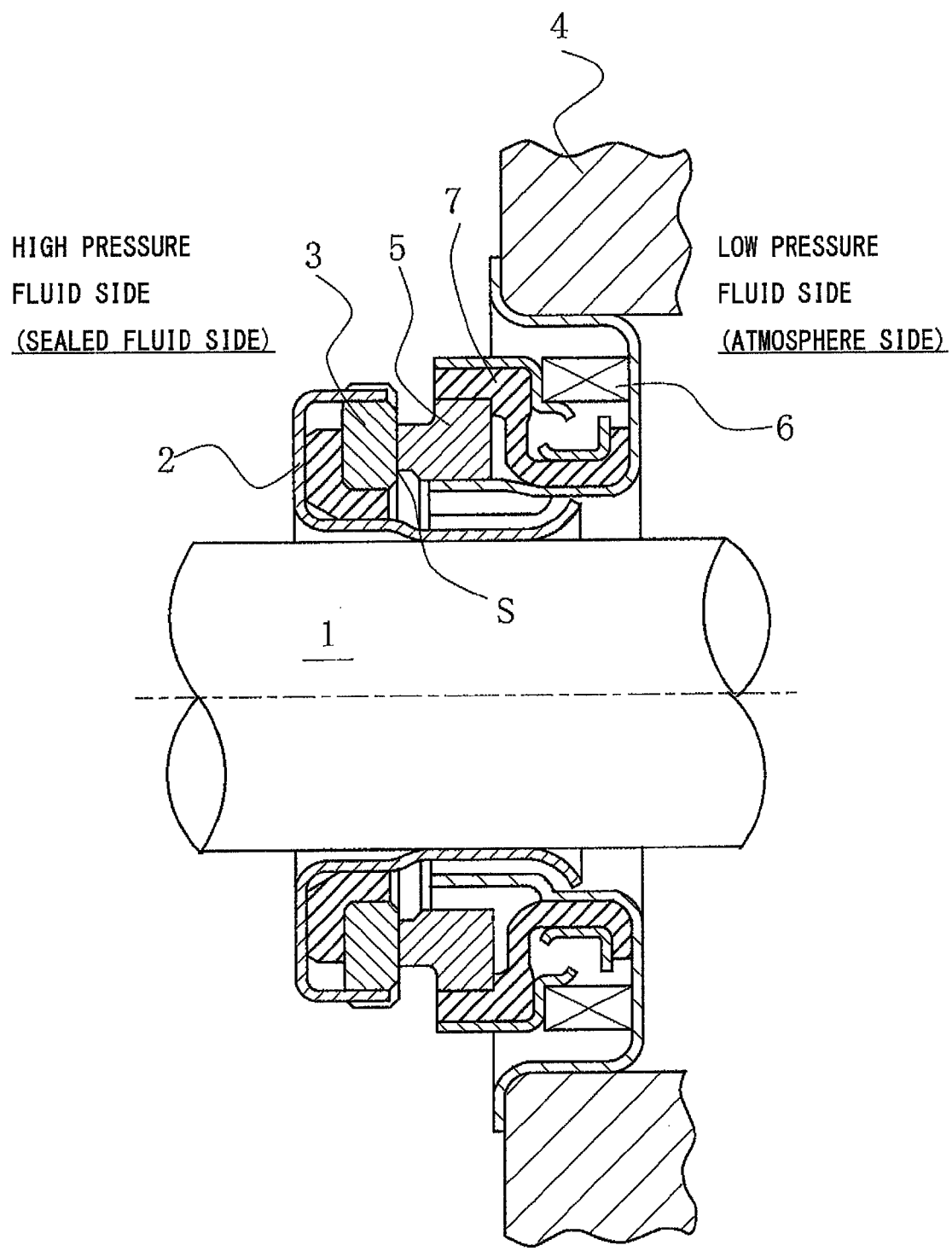
FIG. 1 is a vertically sectional view showing one example of a mechanical seal according to a first embodiment of the present invention.
Figure 2:
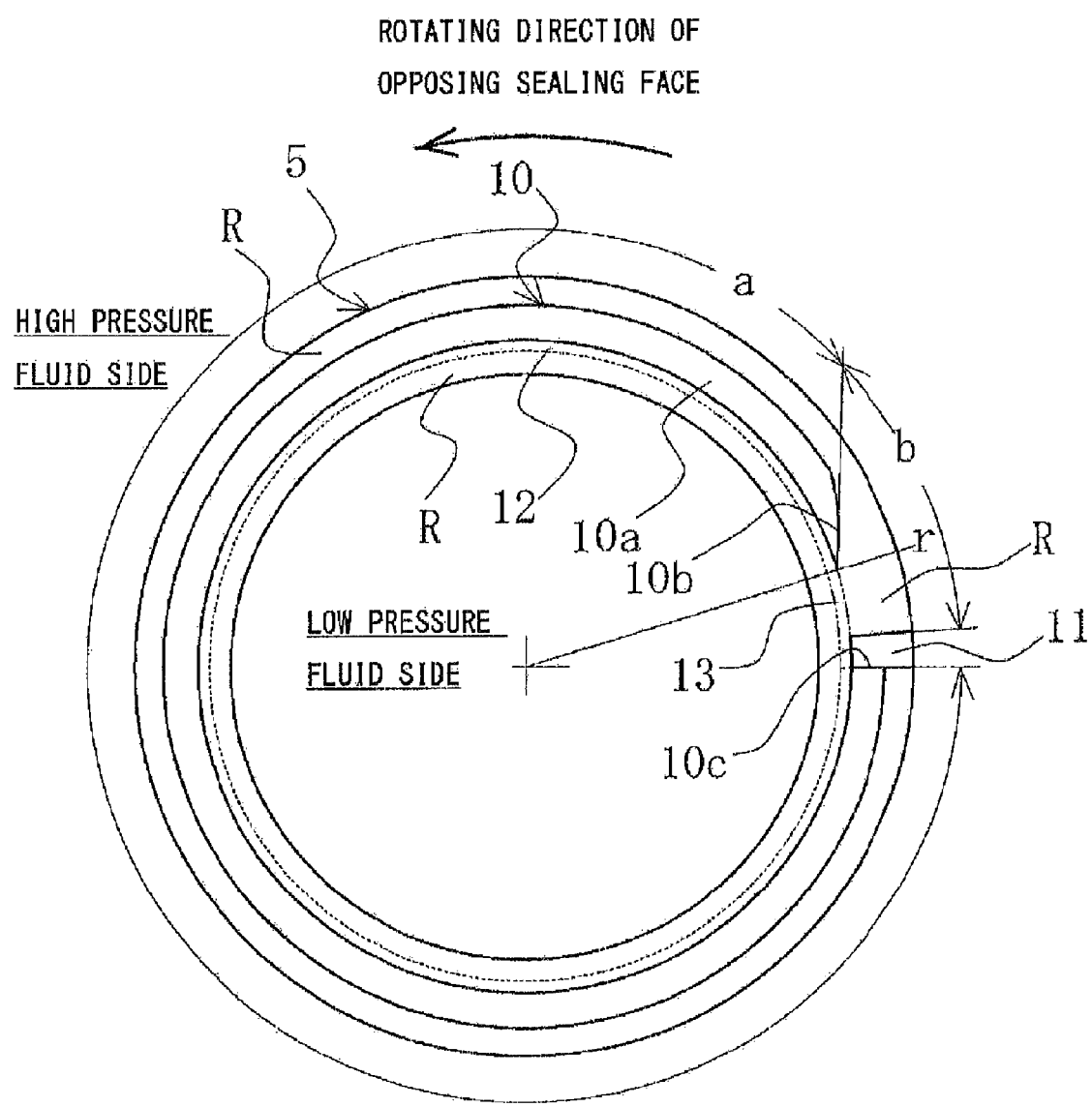
FIG. 2 shows a sealing face of a sliding part according to the first embodiment of the present invention.

With reference to FIGS. 1 and 2, sliding parts according to a first embodiment of the present invention will be described.

It should be noted that in the following embodiment, a mechanical seal serving as one example of the sliding parts will be described as an example. In the description, an outer peripheral side of the sliding parts that form the mechanical seal serves as a high pressure fluid side (sealed fluid side), and an inner peripheral side serves as a low pressure fluid side (atmosphere side). However, the present invention is not limited to this but can also be applied to a case where the high pressure fluid side and the low pressure fluid side are set the other way around.

FIG. 1 is a vertically sectional view showing one example of the mechanical seal that is an inside mechanical seal for sealing a sealed fluid on the high pressure fluid side to be leaked out from an outer periphery of a sealing face toward an inner periphery. In the mechanical seal, on the side of a rotating shaft 1 that drives a pump impeller (not shown) on the high pressure fluid side, an annular rotating ring 3 serving as one of the sliding parts is provided via a sleeve 2 in a state that the rotating ring can be rotated integrally with this rotating shaft 1, an annular stationary ring 5 serving as the other sliding part is provided in a housing 4 of a pump in a state that the stationary ring is not rotated but can be moved in the axial direction, and sealing faces S mirror-finished by lapping or the like closely slide on each other by means of a coiled wave spring 6 and bellows 7 that bias the stationary ring 5 in the axial direction. That is, this mechanical seal is to prevent the sealed fluid from flowing out from an outer periphery of the rotating shaft 1 to the atmosphere side on the sealing faces S of the rotating ring 3 and the stationary ring 5.

FIG. 2 shows the sealing face of the sliding part according to the first embodiment of the present invention. A case where the present invention is applied to the sealing face of the stationary ring 5 of FIG. 2 will be described as an example.

It should be noted that a case where the present invention is applied to the sealing face of the rotating ring 3 is basically similar. However, in that case, a deep groove is only required to communicate with the high pressure fluid side (sealed fluid side) and hence not required to be provided up to the outer peripheral side of the sealing face.

In FIG. 2, the outer peripheral side of the sealing face of the stationary ring 5 serves as the high pressure fluid side, the inner peripheral side serves as the low pressure fluid side such as the atmosphere side, and the opposing sealing face is rotated anti-clockwise in the description.

A reversed Rayleigh step mechanism 10 serving as a negative pressure generation mechanism is provided on the sealing face of the stationary ring 5, a negative pressure generation groove 10a that forms the reversed Rayleigh step mechanism 10 is provided in an arc shape along the circumferential direction of the sealing face so as to be isolated from the high pressure fluid side and the low pressure fluid side by a land section R, an upstream side end 10b and a downstream side end 10c of the negative pressure generation groove 10a are isolated from each other by the land section R, and the downstream side end 10c communicates with the high pressure fluid side via a deep groove 11.

It should be noted that the upstream side end 10b of the negative pressure generation groove 10a forms a reversed Rayleigh step, and the upstream side end will sometimes be called as the reversed Rayleigh step below.

When the opposing sealing face is rotated anti-clockwise and relative sliding is generated, pressure in the negative pressure generation groove 10a of the reversed Rayleigh step mechanism 10 becomes lower than low-pressure fluid pressure, and pressure gradient of a part 12 (part surrounded by a broken line) of the negative pressure generation groove 10a on the inner peripheral side is reversed to make a negative pressure region. Therefore, the fluid to be leaked out to the low pressure fluid side in a region where the negative pressure generation groove 10a is provided and the fluid to be leaked out from a region 13 (positive pressure region surrounded by double chain lines) where no negative pressure generation groove 10a is provided are suctioned into the negative pressure generation groove 10a. Since the fluid suctioned into the negative pressure generation groove 10a is discharged to the high pressure fluid side via the deep groove 11, a sealing property of the sealing faces is ensured.

Negative pressure generation force of the negative pressure generation groove 10a of the reversed Rayleigh step mechanism 10 is determined by a ratio x between circumferential length a of the negative pressure generation groove 10a and circumferential length b of the land section R between the upstream side end 10b of the negative pressure generation groove 10a serving as a starting point and the deep groove 11. Thus, a certain level of circumferential width b of the land section R has to be ensured.

Meanwhile, the greater the negative pressure region including the negative pressure generation groove 10a of the reversed Rayleigh step mechanism 10 is, the more the sealing property as a mechanical seal is improved.

In the example shown in FIG. 2, the ratio x=b/a between the circumferential length a of the negative pressure generation groove 10a and the circumferential length b of the land section R between the upstream side end 10b of the negative pressure generation groove 10a and the deep groove 11 is set to be different in the radial direction.

Specifically, the ratio is set in such a manner that the shape of the upstream side end 10b of the negative pressure generation groove 10a is inclined in the direction of a downstream side from an inner diameter side toward an outer diameter side with respect to a radius line r. Therefore, on the inner diameter side, the circumferential length a of the negative pressure generation groove 10a is larger and the circumferential length b of the land section R between the upstream side end 10b of the negative pressure generation groove 10a and the deep groove 11 is smaller than the outer diameter side. Thus, the ratio x is small on the inner diameter side and large on the outer diameter side.

It should be noted that an inclination mode of the upstream side end 10b of the negative pressure generation groove 10a may be either linear or curved. However, the ratio x is set to be gradually changed.

When the ratio x is set to be gradually changed, pressure on the inner diameter side of the negative pressure generation groove 10a of the reversed Rayleigh step mechanism 10 comes close to pressure on the outer diameter side, and the negative pressure generation force of the reversed Rayleigh step mechanism is not reduced. Thus, a sealing function of the sealing faces can be improved.

When the circumferential length b of the land section R between the upstream side end 10b of the negative pressure generation groove 10a and the deep groove 11 on the inner diameter side is reduced, the negative pressure generation force is accordingly lowered on the inner diameter side of the negative pressure generation groove 10a. However, the circumferential length b of the land section R is increased on the outer diameter side of the negative pressure generation groove 10a, and sufficient negative pressure is generated. In the negative pressure generation region, the fluid is steam and has high fluidity. Thus, when the negative pressure on the outer diameter side of the negative pressure generation groove 10a is increased, this can lead the pressure on the inner diameter side to sufficient negative pressure.

In the prior art, the ratio x between the circumferential length a of the negative pressure generation groove 10a and the circumferential length b of the land section R between the upstream side end 10b of the negative pressure generation groove 10a and the deep groove 11 is fixed. In a case where the ratio x is set in the same state as the inner diameter side in FIG. 2, the negative pressure generation force is reduced, and force to suction the fluid to be leaked out to the low pressure fluid side is weakened, so that the sealing property is lowered.

Conversely, in a case where the ratio x is set in the same state as the outer diameter side in FIG. 2, the negative pressure generation force is increased but the negative pressure region including the negative pressure generation groove 10a is decreased, and the region 13 where no negative pressure generation groove 10a is provided is increased. Thus, the fluid to be leaked out to the low pressure fluid side is increased, so that the sealing property is lowered.

Meanwhile, when the ratio x=b/a is set to be different in the radial direction as in the present embodiment, without reducing the negative pressure generation force, the region 13 where no negative pressure generation groove 10a is provided can be decreased, so that the sealing property can be improved.

In particular, in a case where on the inner diameter side, the circumferential length a of the negative pressure generation groove 10a is larger and the circumferential length b of the land section R between the upstream side end 10b of the negative pressure generation groove 10a and the deep groove 11 is smaller than the outer diameter side, the circumferential length b of the land section R on the outer diameter side where circumferential speed is high is large, so that large negative pressure can be obtained, and the region 13 where no negative pressure generation groove 10a is provided can be decreased on the inner diameter side. Thus, the sealing property can be furthermore improved.

Second Embodiment

Figure 3:
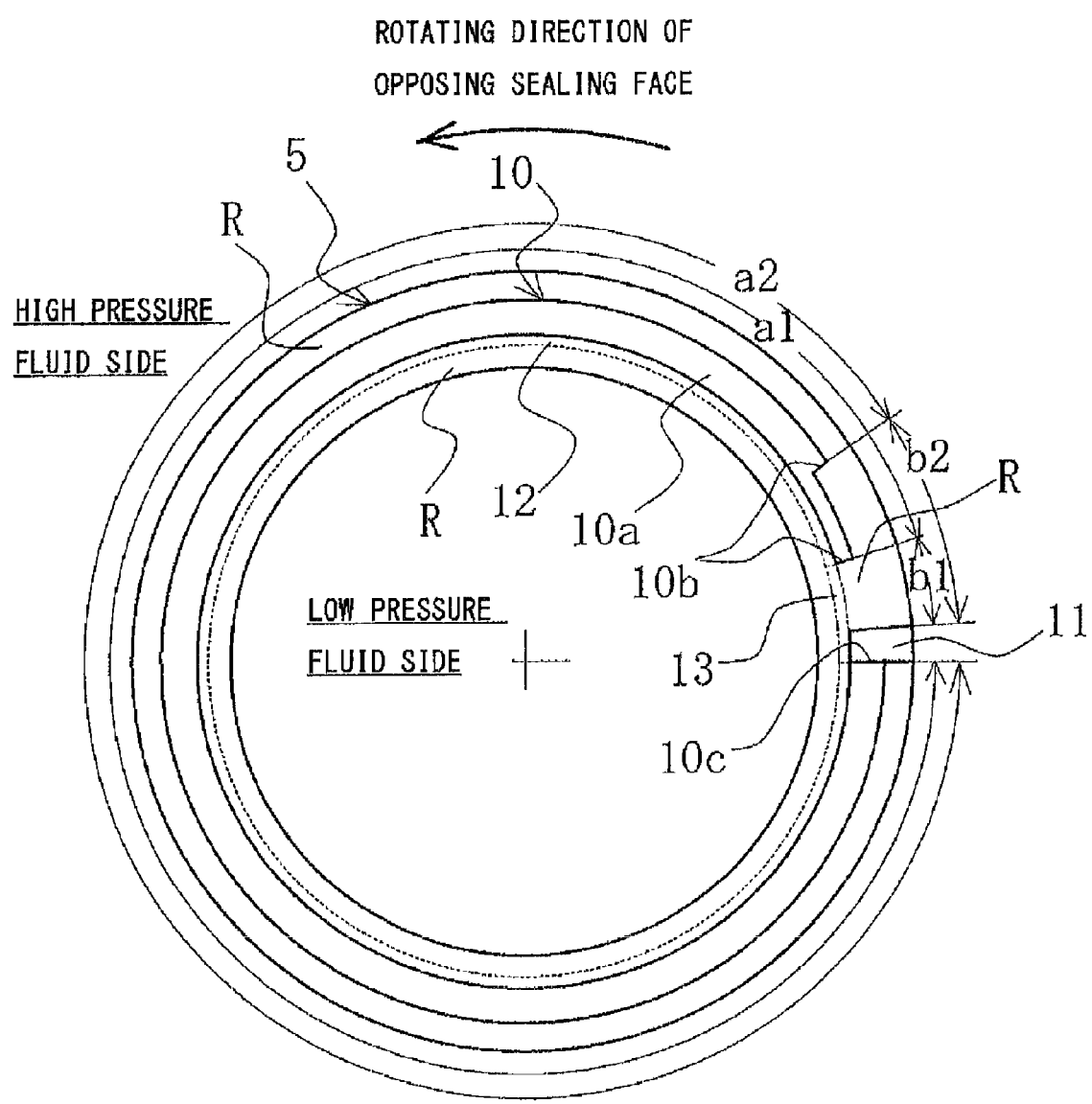
FIG. 3 shows a sealing face of a sliding part according to a second embodiment of the present invention.

With reference to FIG. 3, sliding parts according to a second embodiment of the present invention will be described.

The sliding parts according to the second embodiment are different from the sliding parts of the first embodiment in a point that the shape of the upstream side end 10b of the negative pressure generation groove 10a is set to be changed stepwise. However, the other basic configurations are the same as the first embodiment. The same members will be given the same reference signs and duplicated description will be omitted.

In FIG. 3, the reversed Rayleigh step mechanism 10 is set in such a manner that a ratio x between circumferential length of the negative pressure generation groove 10a and circumferential length of the land section R between the upstream side end 10b of the negative pressure generation groove 10a and the deep groove 11 is different in the radial direction, and the shape of the upstream side end 10b of the negative pressure generation groove 10a is changed stepwise.

Specifically, the shape of the upstream side end 10b of the negative pressure generation groove 10a is set in such a manner that circumferential length a1 of the negative pressure generation groove 10a is large and circumferential length b1 of the land section R between the upstream side end 10b of the negative pressure generation groove 10a and the deep groove 11 is small on the inner diameter side, and circumferential length a2 of the negative pressure generation groove 10a is small and circumferential length b2 of the land section R between the upstream side end 10b of the negative pressure generation groove 10a and the deep groove 11 is large on the outer diameter side. Therefore, on the inner diameter side in comparison to the outer diameter side, the ratio x between the circumferential length of the negative pressure generation groove 10a and the circumferential length b of the land section R between the upstream side end 10b of the negative pressure generation groove 10a and the deep groove 11 is set so that the ratio x=b1/a1 on the inner diameter side is small and the ratio x=b2/a2 on the outer diameter side is large.

When the ratio x is set to be changed stepwise, the region of the land section R where no negative pressure generation groove 10a is provided can be ensured in a substantially fan shape on the outer diameter side. Thus, for example, a Rayleigh step serving as a positive pressure generation mechanism or the like can be provided in this part, so that freedom of design can be increased.

When the circumferential length b1 of the land section R between the upstream side end 10b of the negative pressure generation groove 10a and the deep groove 11 on the inner diameter side is reduced, the negative pressure generation force is accordingly lowered on the inner diameter side of the negative pressure generation groove 10a. However, the circumferential length b2 of the land section R is increased on the outer diameter side of the negative pressure generation groove 10a, and sufficient negative pressure is generated. In the negative pressure generation region, the fluid is steam and has high fluidity. Thus, when the negative pressure on the outer diameter side of the negative pressure generation groove 10a is increased, this can lead the pressure on the inner diameter side to sufficient negative pressure.

In the prior art, the ratio x between the circumferential length of the negative pressure generation groove 10a and the circumferential length of the land section R between the upstream side end 10b of the negative pressure generation groove 10a and the deep groove 11 is fixed. In a case where the ratio x is set in the same state as the inner diameter side in FIG. 3, the negative pressure generation force is reduced, and the force to suction the fluid to be leaked out to the low pressure fluid side is weakened, so that the sealing property is lowered.

Conversely, in a case where the ratio x is set in the same state as the outer diameter side in FIG. 3, the negative pressure generation force is increased but the negative pressure region including the negative pressure generation groove 10a is decreased, and the region 13 where no negative pressure generation groove 10a is provided is increased. Thus, the fluid to be leaked out to the low pressure fluid side is increased, so that the sealing property is lowered.

Meanwhile, when the ratio x=b/a is set to be different in the radial direction as in the present embodiment, without reducing the negative pressure generation force, the region 13 where no negative pressure generation groove 10a is provided can be decreased, so that the sealing property can be improved.

In particular, in a case where on the inner diameter side, the circumferential length a1 of the negative pressure generation groove 10a is larger and the circumferential length b1 of the land section R between the upstream side end 10b of the negative pressure generation groove 10a and the deep groove 11 is smaller than the outer diameter side, the circumferential length b2 of the land section R on the outer diameter side where circumferential speed is high is large, so that large negative pressure can be obtained, and the region 13 where no negative pressure generation groove 10a is provided can be decreased on the inner diameter side. Thus, the sealing property can be furthermore improved.

Third Embodiment

Figure 4:
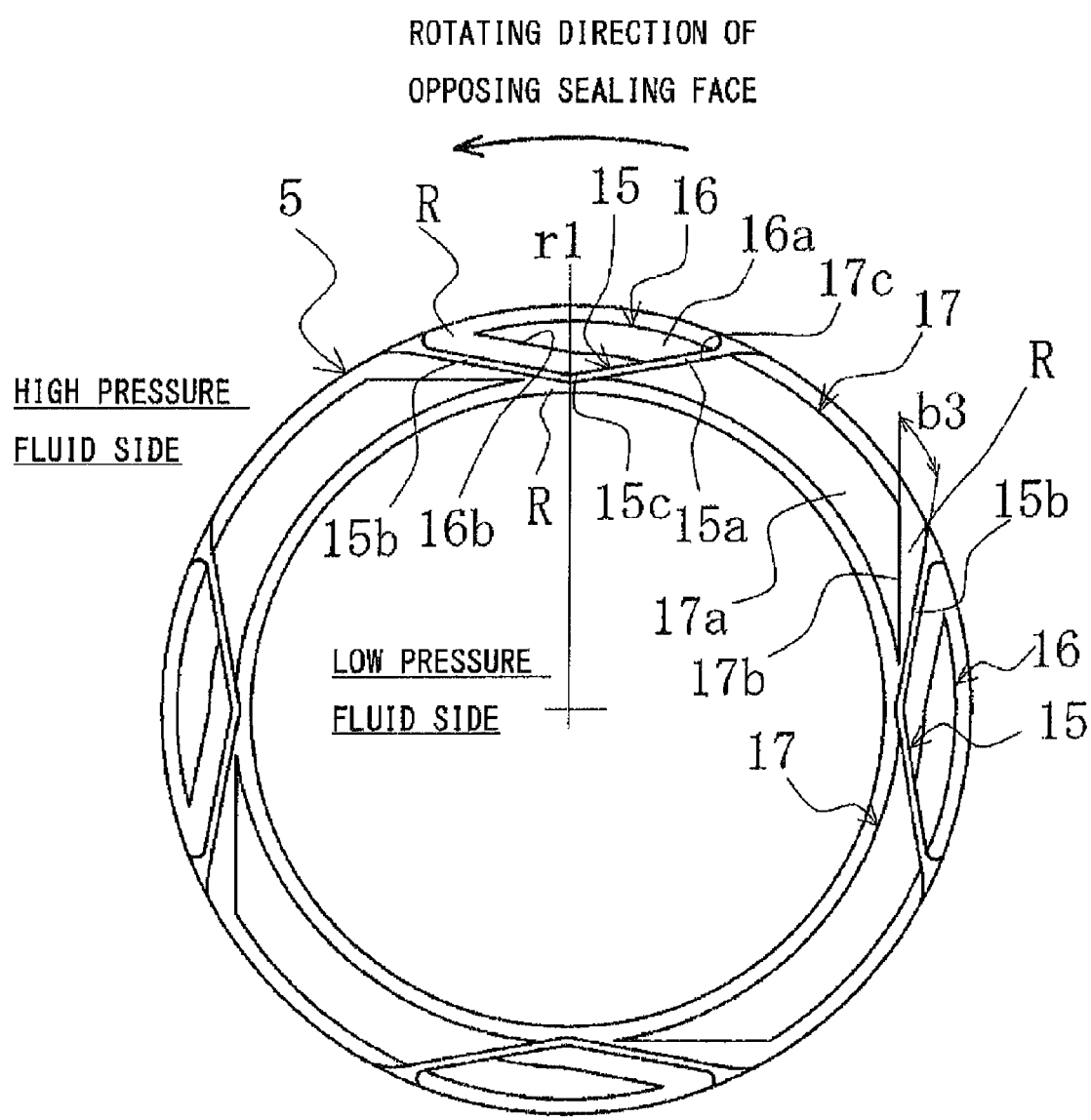
FIG. 4 shows a sealing face of a sliding part according to a third embodiment of the present invention.

With reference to FIG. 4, sliding parts according to a third embodiment of the present invention will be described.

The sliding parts according to the third embodiment are different from the sliding parts of the first embodiment in a point that a plurality of fluid circulation grooves 15 and a plurality of Rayleigh step mechanisms 16 serving as positive pressure generation mechanisms are provided at equal intervals in the circumferential direction and a reversed Rayleigh step mechanism serving as a negative pressure generation mechanism is provided on the sealing face between the fluid circulation grooves. However, the other basic configurations are the same as the first embodiment. The same members will be given the same reference signs and duplicated description will be omitted.

In FIG. 4, the four fluid circulation grooves 15 are provided on the sealing face at equal intervals in the circumferential direction and isolated from each other. Each of the fluid circulation grooves 15 includes an inlet section 15a where the fluid comes in from the high pressure fluid side, an outlet section 15b where the fluid goes out to the high pressure fluid side, and a communication section 15c that provides communication between the inlet section 15a and the outlet section 15b in the circumferential direction, and is isolated from the lower pressure fluid side by the land section R. The fluid circulation groove 15 plays a role of actively introducing the sealed fluid onto the sealing face from the high pressure fluid side and discharging the fluid in order to prevent concentration of the fluid containing corrosion products and the like on the sealing face. The inlet section 15a and the outlet section 15b are formed in such a manner that the sealed fluid is easily taken onto the sealing face and discharged in accordance with the rotating direction of the opposing sealing face, while the fluid circulation groove is isolated from the low pressure fluid side by the land section R in order to reduce leakage. In this example, the inlet section 15a and the outlet section 15b are formed in a linear shape in the directions opening in a substantially V form from a point to cross a radius line r1. However, the present invention is not particularly limited to this but the sections may be formed in a curved shape (such as an arc shape), or an opening degree of the inlet section 15a and the outlet section 15b may be further increased.

Each of the positive pressure generation mechanisms 16 including a positive pressure generation groove 16a that is shallower than the fluid circulation groove 15 is provided in a part surrounded by each of the fluid circulation grooves 15 and the high pressure fluid side. The positive pressure generation mechanism 16 increases a fluid film between the sealing faces by generating positive pressure (dynamic pressure), so as to improve a lubrication performance.

The positive pressure generation groove 16a communicates with the inlet section of the fluid circulation groove 15, and is isolated from the outlet section 15b and the communication section 15c and the high pressure fluid side by a land section R.

In this example, the positive pressure generation mechanism 16 is formed from a Rayleigh step mechanism including the positive pressure generation groove 16a that communicates with the inlet section 15a of the fluid circulation groove 15, and a Rayleigh step 16b. However, the present invention is not limited to this. For example, the positive pressure generation mechanism may be formed from a femto groove with a dam, that is, any mechanism that generates positive pressure.

A reversed Rayleigh step mechanism 17 that forms a negative pressure generation mechanism including a negative pressure generation groove 17a shallower than the fluid circulation groove 15, and a reversed Rayleigh step 17b is provided between the adjacent fluid circulation grooves 15, 15 among the four fluid circulation grooves 15 arranged at equal intervals in the circumferential direction. The negative pressure generation groove 17a is provided in an arc shape along the circumferential direction of the sealing face so as to be isolated from the high pressure fluid side and the low pressure fluid side by the land section R. The reversed Rayleigh step 17b of an upstream side end of the negative pressure generation groove 17a and the outlet section 15b of the fluid circulation groove 15 are isolated from each other by the land section R, and a downstream side end 17c communicates with the high pressure fluid side via the inlet section 15a of the fluid circulation groove 15.

It should be noted that the Rayleigh step mechanism and the reversed Rayleigh step mechanism will be described in detail later.

The shape of the upstream side end (reversed Rayleigh step) 17b of the negative pressure generation groove 17a is not parallel with the outlet section 15b of the fluid circulation groove 15 but set to be inclined in the direction of the downstream side in such a manner that circumferential length of the land section R between the upstream side end (reversed Rayleigh step) 17b of the negative pressure generation groove 17a and the outlet section 15b of the fluid circulation groove 15 is increased from the inner diameter side toward the outer diameter side. Therefore, on the inner diameter side, the circumferential length b3 of the land section R between the upstream side end 17b of the negative pressure generation groove 17a and the outlet section 15b of the fluid circulation groove 15 is smaller than the outer diameter side.

It should be noted that an inclination mode of the upstream side end 17b of the negative pressure generation groove 17a may be either linear or curved, and the ratio x may be gradually changed or may be radically changed stepwise.

When the circumferential length b3 of the land section R between the upstream side end 17b of the negative pressure generation groove 17a and the outlet section 15b of the fluid circulation groove 15 on the inner diameter side is reduced, the negative pressure generation force is accordingly lowered on the inner diameter side of the negative pressure generation groove 17a. However, the circumferential length b3 of the land section R is increased on the outer diameter side of the negative pressure generation groove 17a, and sufficient negative pressure is generated. In the negative pressure generation region, the fluid is steam and has high fluidity. Thus, when the negative pressure on the outer diameter side of the negative pressure generation groove 17a is increased, this can lead the pressure on the inner diameter side to sufficient negative pressure.

In this example, the shape of the upstream side end (reversed Rayleigh step) 17b of the negative pressure generation groove 17a is not parallel with the outlet section 15b of the fluid circulation groove 15 but set to be inclined in the direction of the downstream side in such a manner that the circumferential length of the land section R between the upstream side end (reversed Rayleigh step) 17b of the negative pressure generation groove 17a and the outlet section 15b of the fluid circulation groove 15 is increased from the inner diameter side toward the outer diameter side. Thus, without reducing the negative pressure generation force, a region where no negative pressure generation groove 17a is provided can be decreased, so that the sealing property can be improved. In addition, the sealed fluid is actively introduced onto the sealing face from the high pressure fluid side and discharged by the fluid circulation grooves 15. Thus, the concentration of the fluid containing corrosion products and the like on the sealing face is prevented.

Since the positive pressure (dynamic pressure) is generated on the sealing face by the positive pressure generation mechanisms 16, the fluid film between the sealing faces is increased, so that the lubrication performance is improved.

Figure 5:
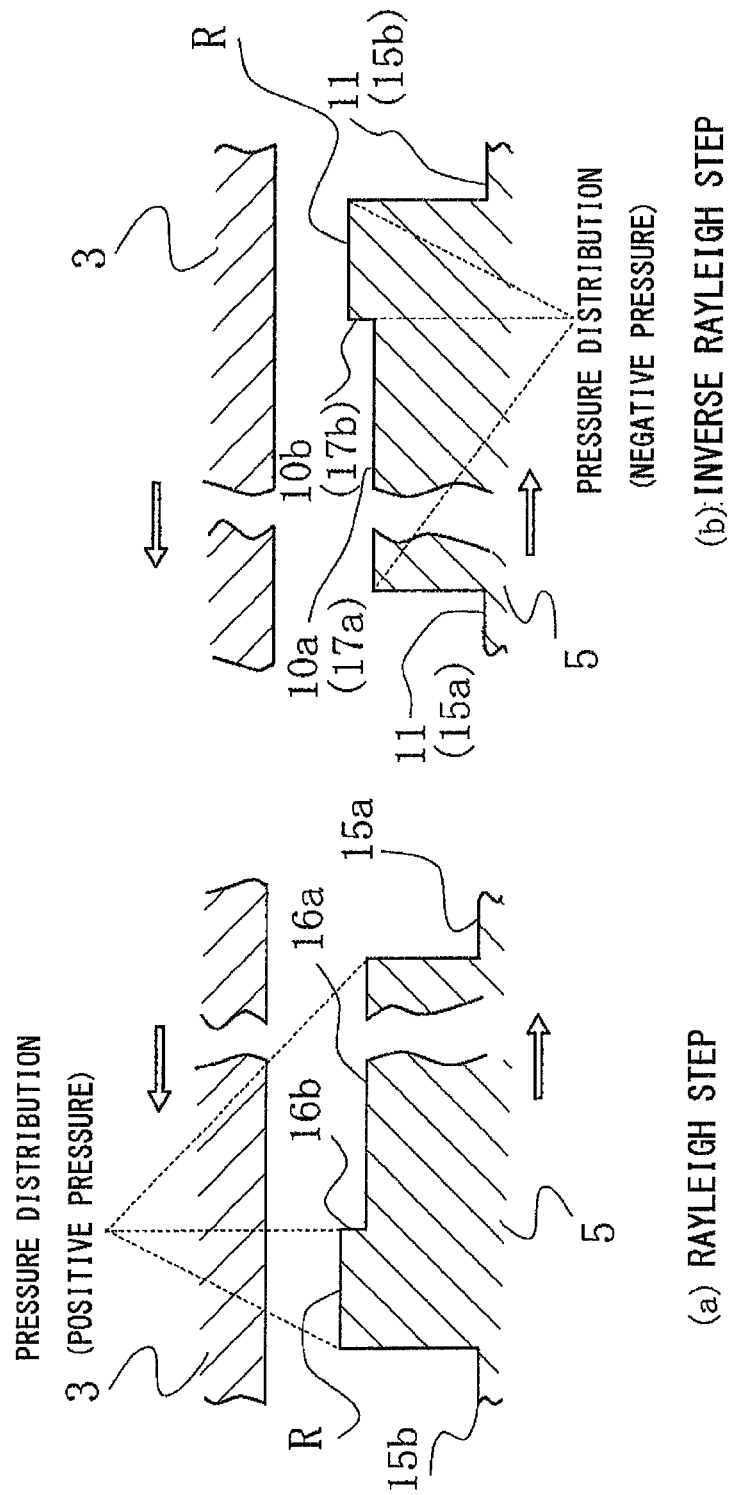
Figure 6:
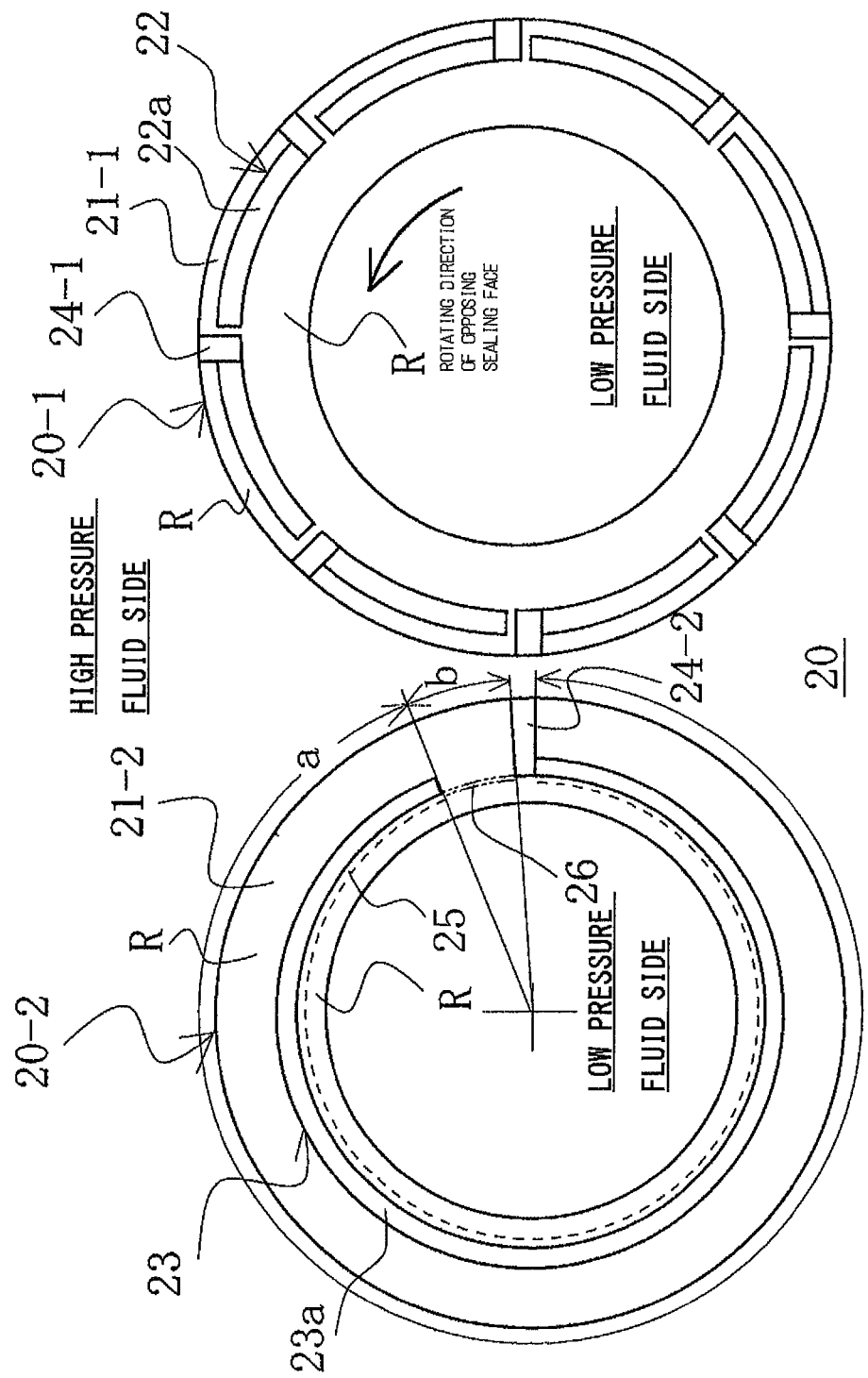
FIG. 6 is a view for illustrating the prior art.

Now, with reference to FIG. 5, the positive pressure generation mechanism formed from the Rayleigh step mechanism or the like and the negative pressure generation mechanism formed from the reversed Rayleigh step mechanism or the like will be described.

In FIG. 5(a), the rotating ring 3 and the stationary ring 5 serving as the opposing sliding parts relatively slide on each other as shown by arrows. For example, the Rayleigh step 16b is formed on the sealing face of the stationary ring 5 so as to be perpendicular to the relative movement direction and facing the upstream side, and the negative pressure generation groove 16a serving as the positive pressure generation groove is formed on the upstream side of the Rayleigh step 16b. The opposing sealing faces of the rotating ring 3 and the stationary ring 5 are flat.

When the rotating ring 3 and the stationary ring 5 are relatively moved in the directions shown by the arrows, the fluid placed between the sealing faces of the rotating ring 3 and the stationary ring 5 follows and moves in the movement direction of the rotating ring 3 or the stationary ring 5 due to a viscous property thereof. Thus, at the time, the positive pressure (dynamic pressure) as shown by broken lines is generated due to existence of the Rayleigh step 16a.

It should be noted that the reference signs 15a, 15b denote the inlet section and the outlet section of the fluid circulation groove 15, and the reference sign R denotes the land section that forms the sealing face S (seal face).

In FIG. 5(b), the rotating ring 3 and the stationary ring 5 serving as the opposing sliding parts also relatively slide on each other as shown by arrows. However, the reversed Rayleigh step 10b (17b) is formed on the sealing faces of the rotating ring 3 and the stationary ring 5 so as to be perpendicular to the relative movement direction and facing the downstream side, and the groove section 10a (17a) serving as the negative pressure generation groove is formed on the downstream side of the reversed Rayleigh step 10b (17b). The opposing sealing faces of the rotating ring 3 and the stationary ring 5 are flat.

When the rotating ring 3 and the stationary ring 5 are relatively moved in the directions shown by the arrows, the fluid placed between the sealing faces of the rotating ring 3 and the stationary ring 5 follows and moves in the movement direction of the rotating ring 3 or the stationary ring 5 due to the viscous property thereof. Thus, at the time, negative pressure (dynamic pressure) as shown by broken lines is generated due to existence of the reversed Rayleigh step 10b (17b).

It should be noted that the reference sign 11 denotes the deep groove, the reference signs 15a, 15b denote the inlet section and the outlet section of the fluid circulation groove 15, and further, the reference sign R denotes the land section that forms the sealing face S (seal face).

The embodiments of the present invention are described above with the drawings. However, specific configurations are not limited to these embodiments but modifications and additions that are made within the range not departing from the gist of the present invention are also included in the present invention.

For example, although the example that the sliding parts are used for any of a pair of rotating and stationary sealing rings in a mechanical seal device is described in the above embodiments, the sliding parts can also be utilized as sliding parts of a bearing that slides on a rotating shaft while sealing lubricating oil on one side in the axial direction of a cylindrical sealing face.

In addition, for example, although the case where the high-pressure sealed fluid exists on the outer peripheral side is described in the above embodiments, the present invention can also be applied to a case where the high-pressure fluid exists on the inner peripheral side.

In addition, for example, the case where the reversed Rayleigh step serving as the negative pressure generation mechanism and the Rayleigh step serving as the fluid circulation groove and the positive pressure generation groove are provided in the stationary ring of the mechanical seal that forms the sliding parts is described in the above embodiments. However, the reversed Rayleigh step and the Rayleigh step may be reversely provided in the rotating ring.

In addition, for example, the reversed Rayleigh step serving as the negative pressure generation mechanism may be provided in one of sealing rings, the Rayleigh step serving as the positive pressure generation mechanism may be provided in the other sealing ring, and the fluid circulation groove may be provided in any of the sealing rings.

In addition, for example, although the example that one reversed Rayleigh step mechanism serving as the negative pressure generation mechanism is provided is described in the first and second embodiments, the present invention is not limited to this but for example two or more reversed Rayleigh step mechanisms may be provided.

REFERENCE SIGNS LIST

1 Rotating shaft
2 Sleeve
3 Rotating ring
4 Housing
5 Stationary ring
6 Coiled wave spring
7 Bellows
10 Reversed Rayleigh step mechanism
10a Negative pressure generation groove
10b Upstream side end of negative pressure generation groove
10c Downstream side end of negative pressure generation groove
11 Deep groove
12 Part of negative pressure generation groove on inner peripheral side
13 Region where no negative pressure generation groove is provided
15 Fluid circulation groove
15a Inlet section of fluid circulation groove
15b Outlet section of fluid circulation groove
15c Communication section of fluid circulation groove
16 Positive pressure generation mechanism (Rayleigh step mechanism)
16a Positive pressure generation groove
16b Rayleigh step
17 Negative pressure generation mechanism (reversed Rayleigh step mechanism)
17a Negative pressure generation groove
17b Reversed Rayleigh step
S Sealing face (seal face)
R Land section
r, r1 Radius line
a, a1, a2 Circumferential length of negative pressure generation groove
b, b1, b2, b3 Circumferential length of land section between upstream side end of negative pressure generation groove and deep groove or outlet section of fluid circulation groove
x Ratio represented by b/a

The invention claimed is:

1. Sliding parts of a pair of annular bodies comprising sealing faces that relatively slide on each other, wherein:
a reversed Rayleigh step mechanism serving as a negative pressure generation mechanism is provided in at least one of the sealing faces;
a negative pressure generation groove that forms the reversed Rayleigh step mechanism is provided in an arc shape along a circumferential direction of the sealing face so as to be isolated from a high pressure fluid side and a low pressure fluid side by a land section;
an upstream side end and a downstream side end of the negative pressure generation groove are isolated from each other by a land section;
the downstream side end communicates with the high pressure fluid side via a deep groove; and
a ratio x=b/a between circumferential length a of the negative pressure generation groove and circumferential length b of the land section between the upstream side end of the negative pressure generation groove and the deep groove is set to be different in a radial direction.

2. The sliding parts as set forth in claim 1, wherein:
the ratio x is set to be small on an inner diameter side and large on an outer diameter side.

3. The sliding parts as set forth in claim 2, wherein:
the ratio x is set to be gradually changed.

4. The sliding parts as set forth in claim 2, wherein:
the ratio x is set to be changed stepwise.

5. Sliding parts of a pair of annular bodies comprising sealing faces that relatively slide on each other, wherein:
fluid circulation grooves, each of the fluid circulation grooves including an inlet section where a fluid comes in from a high pressure fluid side, an outlet section where the fluid goes out to the high pressure fluid side, and a communication section that provides communication between the inlet section and the outlet section are provided in at least one of the sealing faces;
the plurality of fluid circulation grooves is isolated from a low pressure fluid side by a land section, and provided in a circumferential direction of the sealing face and isolated by the land section;
a positive pressure generation mechanism is provided in a part surrounded by the fluid circulation groove and the high pressure fluid side;
a reversed Rayleigh step mechanism serving as the negative pressure generation mechanism is provided between the plurality of fluid circulation grooves;
a negative pressure generation groove that forms the reversed Rayleigh step mechanism is provided in an arc shape along the circumferential direction of the sealing face so as to be isolated from the high pressure fluid side and the low pressure fluid side by the land section;
an upstream side end and a downstream side end of the negative pressure generation groove are isolated by the land section;
the downstream side end communicates with the high pressure fluid side via the inlet section of the fluid circulation groove; and
circumferential length of the land section between the upstream side end of the negative pressure generation groove and the outlet section of the fluid circulation groove is set to be small on an inner diameter side and large on an outer diameter side.

\* \* \* \* \*